US008168125B2

(12) United States Patent
Choi

(10) Patent No.: US 8,168,125 B2
(45) Date of Patent: May 1, 2012

(54) DIESEL OXIDATION CATALYST AND EXHAUST SYSTEM PROVIDED WITH THE SAME

(75) Inventor: Sung Mu Choi, Seongnam (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 304 days.

(21) Appl. No.: 12/511,877

(22) Filed: Jul. 29, 2009

(65) Prior Publication Data

US 2010/0126150 A1 May 27, 2010

(30) Foreign Application Priority Data

Nov. 21, 2008 (KR) ........................ 10-2008-0116420

(51) Int. Cl.
*B01D 50/00* (2006.01)
*F01N 3/00* (2006.01)

(52) U.S. Cl. ......................................... 422/177; 60/297

(58) Field of Classification Search .................. 422/177, 422/180; 60/274
See application file for complete search history.

(56) References Cited

U.S. PATENT DOCUMENTS

| | | | | |
|---|---|---|---|---|
| 5,447,694 | A * | 9/1995 | Swaroop et al. | 422/171 |
| 2001/0026838 | A1* | 10/2001 | Dettling et al. | 427/230 |
| 2001/0053340 | A1* | 12/2001 | Noda et al. | 423/213.2 |
| 2003/0213232 | A1* | 11/2003 | Brisley et al. | 60/285 |

* cited by examiner

*Primary Examiner* — Tom Duong
(74) *Attorney, Agent, or Firm* — Morgan, Lewis & Bockius LLP

(57) ABSTRACT

A diesel oxidation catalyst mounted on an exhaust pipe that exhausts an exhaust gas generated in an engine to the exterior may include a first portion having a hydrocarbon trap (HC trap) coated thereon, the HC trap absorbing or releasing a hydrocarbon (HC) depending on whether or not a predetermined condition is satisfied, and a second portion having an oxidation catalyst coated thereon, the oxidation catalyst oxidizing the hydrocarbon (HC) and a carbon monoxide (CO) in the exhaust gas, wherein the second portion performs oxidation reaction with the HC released from the first portion and releases sulphur absorbed at the oxidation catalyst by using oxidation heat generated in the oxidation reaction thereof.

8 Claims, 6 Drawing Sheets

DIESEL OXIDATION CATALYST AND EXHAUST SYSTEM PROVIDED WITH THE SAME

CROSS-REFERENCE TO RELATED APPLICATION

The present application claims priority to Korean Patent Application Number 10-2008-0116420 filed on Nov. 21, 2008, the entire contents of which application is incorporated herein for all purposes by this reference.

BACKGROUND OF THE INVENTION

1. Field of the Invention

The present invention relates to a diesel oxidation catalyst and an exhaust system provided with the same. More particularly, the present invention relates to a diesel oxidation catalyst and an exhaust system provided with the same that releases sulphur absorbed at an oxidation catalyst in high temperature by using hydrocarbon (HC) absorbed in low temperature.

2. Description of Related Art

Generally, exhaust gas flowing out through an exhaust manifold from an engine is driven into a catalytic converter mounted at an exhaust pipe and is purified therein. After that, the noise of the exhaust gas is decreased while passing through a muffler and then the exhaust gas is emitted into the air through a tail pipe. The catalytic converter is a type of diesel particulate filter (DPF) and purifies pollutants contained in the exhaust gas. A catalytic carrier for trapping particulate material (PM) contained in the exhaust gas is in the catalytic converter, and the exhaust gas flowing out from the engine is purified through a chemical reaction therein.

One type of catalytic converters is a diesel oxidation catalyst (DOC). The DOC oxidizes HC and CO contained in the exhaust gas.

Meanwhile, since sulphur contained in a fuel deteriorates performance of the oxidation catalyst, a noble metal including platinum (Pt) that has high sulphur tolerance is mainly used for the DOC. However, since platinum is expensive, manufacturing cost of the DOC becomes expensive. Therefore, the oxidation catalyst including platinum and palladium (Pd) is mainly used. In this case, deterioration in activity of the oxidation catalyst caused by sulphur is a major concern.

Particularly, deterioration in activity of the oxidation catalyst caused by sulphur is extremely large when temperature of the exhaust gas is low.

FIG. 6 is a graph showing relations between a temperature of an exhaust gas and a time required for recovering activity of an oxidation catalyst after poisoning of sulphur. As shown in FIG. 6, 5 minute is required for recovering activity of the oxidation catalyst in a case that the temperature of the exhaust gas is 400° C., 1 minute is required for recovering activity of the oxidation catalyst in a case that the temperature of the exhaust gas is 450° C., and 10 second is required for recovering activity of the oxidation catalyst in a case that the temperature of the exhaust gas is 500° C. Therefore, in order to use the oxidation catalyst including the platinum and the palladium, the temperature of the exhaust gas must be maintained higher than 450° C., but it is very difficult.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a diesel oxidation catalyst and an exhaust system provided with the same having advantages of recovering activity of an oxidation catalyst as a consequence of releasing sulphur absorbed at the oxidation catalyst by using oxidation heat of hydrocarbon contained in an exhaust gas.

In an aspect of the present invention, the diesel oxidation catalyst mounted on an exhaust pipe that exhausts an exhaust gas generated in an engine to the exterior, may include a first portion having a hydrocarbon trap (HC trap) coated thereon, the HC trap absorbing or releasing a hydrocarbon (HC) depending on whether or not a predetermined condition is satisfied, and a second portion having an oxidation catalyst coated thereon, the oxidation catalyst oxidizing the hydrocarbon (HC) and a carbon monoxide (CO) in the exhaust gas, wherein the second portion performs oxidation reaction with the HC released from the first portion and releases sulphur absorbed at the oxidation catalyst by using oxidation heat generated in the oxidation reaction thereof.

The first portion may be coated on a carrier and the second portion is coated on the first portion, wherein the exhaust gas is configured to contact the second portion at first.

The first portion may be coated on a carrier and the second portion is coated on the carrier, wherein the first portion and the second portion are aligned in sequence along a flowing direction of the exhaust gas such that the exhaust gas contacts the first portion at first.

The first portion may be coated on a carrier at a front portion of the diesel oxidation catalyst, and the second portion is coated on the carrier at a rear portion of the diesel oxidation catalyst.

The predetermined condition may be satisfied when temperature of the exhaust gas is higher than a predetermined temperature.

The hydrocarbon trap may be a beta zeolite, wherein the beta zeolite has a structure of twelve rings and ratio of silica $SiO_2$ to aluminum oxide $Al_2O_3$ is 24-38.

The hydrocarbon trap may be between approximately 30% and approximately 50% of entire washcoat in the first portion.

A noble metal including platinum (Pt) and palladium (Pd) may be used for the oxidation catalyst.

In another aspect of the present invention, an exhaust system is mounted on an exhaust pipe through which an exhaust gas generated in an engine passes and purifies noxious materials contained in the exhaust gas, wherein the exhaust system may include a diesel oxidation catalyst oxidizing HC and CO, and wherein the diesel oxidation catalyst is a diesel oxidation catalyst.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
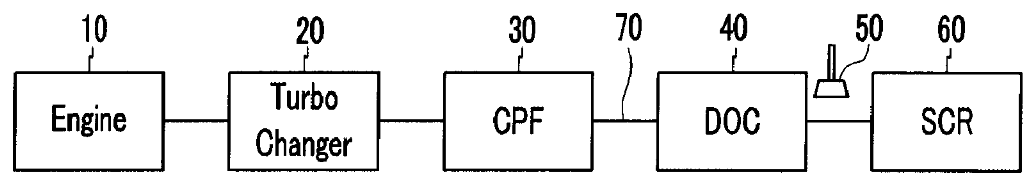
FIG. 1 is a schematic diagram of an exhaust system provided with an exemplary diesel oxidation catalyst according to the present invention.

FIG. 1 is a schematic diagram of an exhaust system provided with a diesel oxidation catalyst according to various embodiments of the present invention. One type of exhaust systems provided with a diesel oxidation catalyst according to various embodiments of the present invention will be exemplarily described, but the sprit of the present invention cannot be limited to the embodiments exemplified herein.

As shown in FIG. 1, an exhaust gas generated in an engine 10 passes sequentially through a turbo charger 20, a catalyzed particulate filter (CPF) 30, a diesel oxidation catalyst (DOC) 40, an injection nozzle 50, and a selective catalytic reduction (SCR) apparatus 60, and noxious materials contained in the exhaust gas are purified in this process. The turbo charger 20, the CPF 30, the DOC 40, the injection nozzle 50, and the SCR apparatus 60 are mounted on an exhaust pipe 70.

The engine 10 includes a plurality of cylinders (not shown) for burning an air-fuel mixture. The cylinder is connected to an intake manifold (not shown) so as to receive the air-fuel mixture, and the intake manifold is connected to an intake pipe (not shown) so as to receive an air.

In addition, the cylinder is connected to an exhaust manifold (not shown), and the exhaust gas generated in a combustion process is gathered in the exhaust manifold. The exhaust manifold is connected to the exhaust pipe 70.

The turbo charger 20 rotates a turbine (not shown) by using energy of the exhaust gas so as to increase intake amount of the air.

The CPF 30 is mounted downstream of the turbo charger 20. The CPF 30 traps PM contained in the exhaust gas and regenerates the trapped PM (i.e., soot). Regeneration of the soot, generally, starts when pressure difference between inlet and outlet of the CPF is greater than a predetermined pressure (about, 20-30 kpa).

The DOC 40 is mounted downstream of the CPF 30 and receives from the CPF 30 the exhaust gas in which the PM is removed. The DOC 40 oxidizes hydrocarbon (HC) and carbon monoxide (CO) contained in the exhaust gas into carbon dioxide ($CO_2$).

The injection nozzle 50 is mounted between the DOC 40 and the SCR apparatus 60 and doses a reducing agent to the exhaust gas in which the HC and the CO is removed at the DOC 40. The reducing agent may be ammonia. Generally, urea is dosed into the exhaust gas by the injection nozzle 50 and the urea is decomposed into ammonia.

The exhaust gas mixed with the reducing agent is supplied to the SCR apparatus 60.

The SCR 60 is mounted downstream of the injection nozzle 50 and includes a zeolite-catalyst where transition elements are ion-exchanged. The transition elements may be copper or iron so as to effectively reduce $NO_x$. The SCR 60 reduces $NO_x$ contained in the exhaust gas into nitrogen gas ($N_2$) by using the reducing agent so as to remove $NO_x$ in the exhaust gas.

Hereinafter, the diesel oxidation catalyst according to various embodiments of the present invention will be described in detail.

Figure 2:
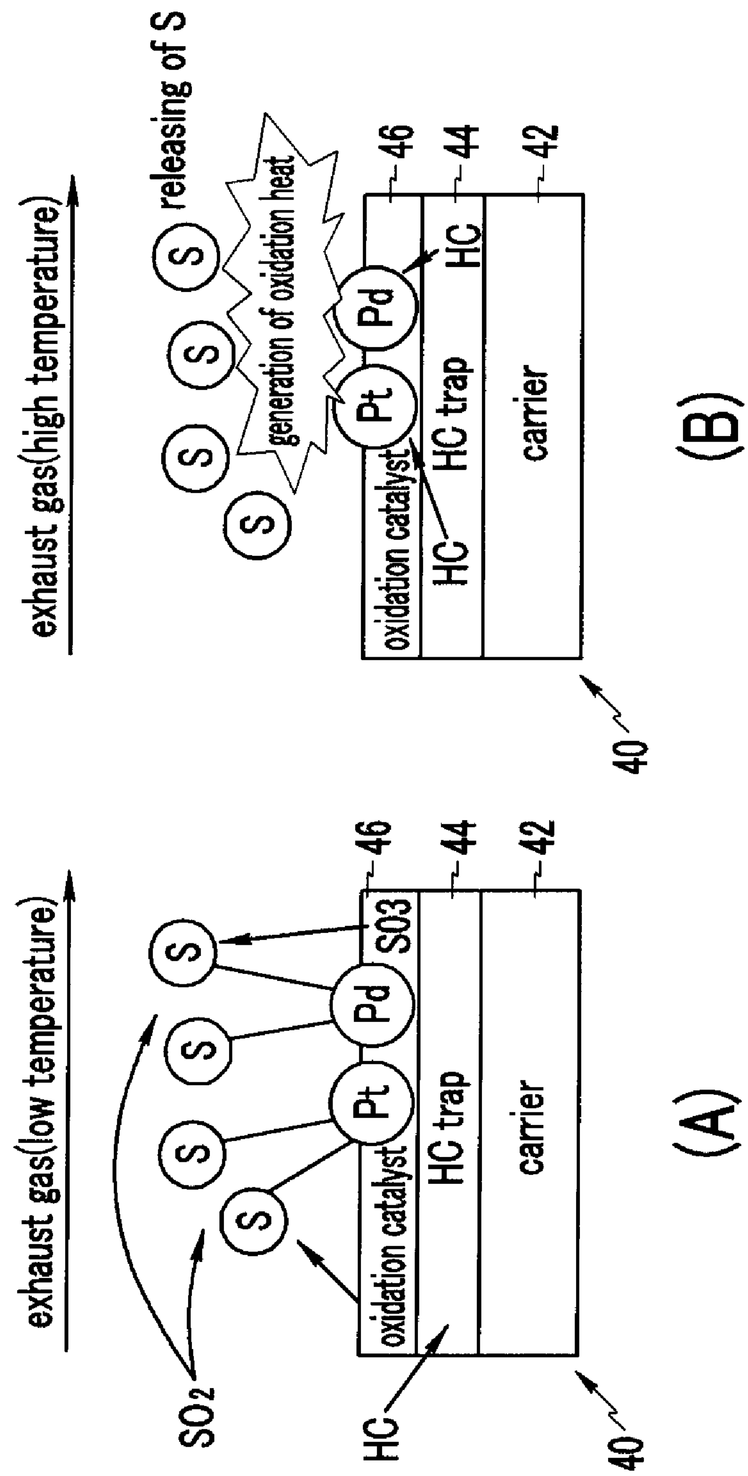
FIG. 2 is a schematic diagram of an exemplary diesel oxidation catalyst according to the present invention.

As shown in FIG. 2, the DOC 40 according to various embodiments of the present invention includes a carrier 42, a first portion 44, and a second portion 46.

The first portion 44 is washcoat including hydrocarbon trap (HC trap) and is coated on the carrier 42. A beta zeolite is used for the HC trap in order to effectively absorb the hydrocarbon. Particularly, the beta zeolite has a structure of twelve rings and ratio of silica $SiO_2$ to aluminum oxide $Al_2O_3$ is 24-38. In addition, the beta zeolite is 30-50% of entire washcoat in the first portion 44.

Generally, the beta zeolite absorbs the HC when temperature of the exhaust gas is lower than or equal to 250° C. and releases the absorbed HC when the temperature of the exhaust gas is higher than 250° C. Therefore, the first portion 44 absorbs the HC when the temperature of the exhaust gas is lower than or equal to a predetermined temperature and releases the HC when the temperature of the exhaust gas is higher than the predetermined temperature.

The second portion 46 is washcoat including an oxidation catalyst of platinum and palladium, and is coated on the first portion 44. The second portion 44 oxidizes the HC and the CO contained in the exhaust gas. In addition, the second portion 46 oxidizes the HC released from the first portion 44. In this case, temperature of the DOC 40 rises quickly such that the temperature of DOC 40 is larger than or equal to 500° C. because of oxidation heat of the HC, and accordingly, sulphur absorbed at the DOC 40 is released.

Figure 3:
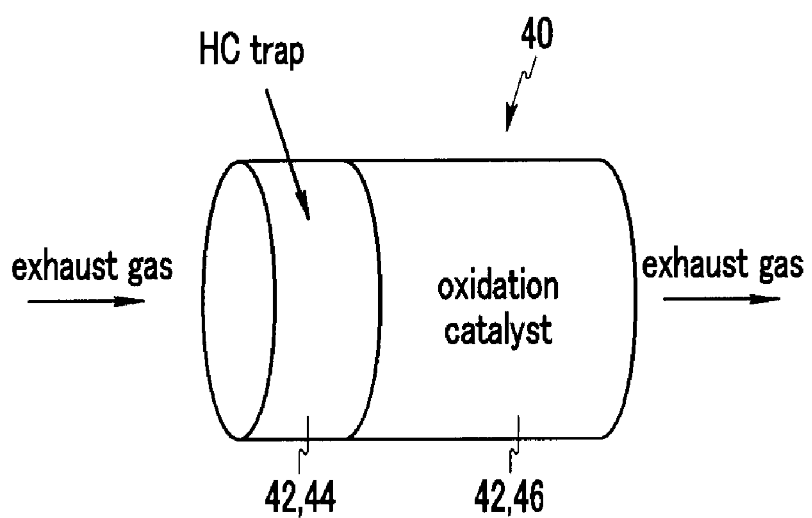
FIG. 3 is a schematic diagram of another exemplary diesel oxidation catalyst according to the present invention.

As shown in FIG. 3, the DOC 40 according to other exemplary embodiments of the present invention is the same as that 40 except coating structure of the DOC 40.

The DOC 40 according to various embodiments of the present invention includes the carrier 42, the first portion 44, and the second portion 46.

The first portion 44 is coated on the carrier 42 at a front portion of the DOC 40, and the second portion 46 is coated on the carrier 42 at a rear portion of the DOC 40.

Figure 4:
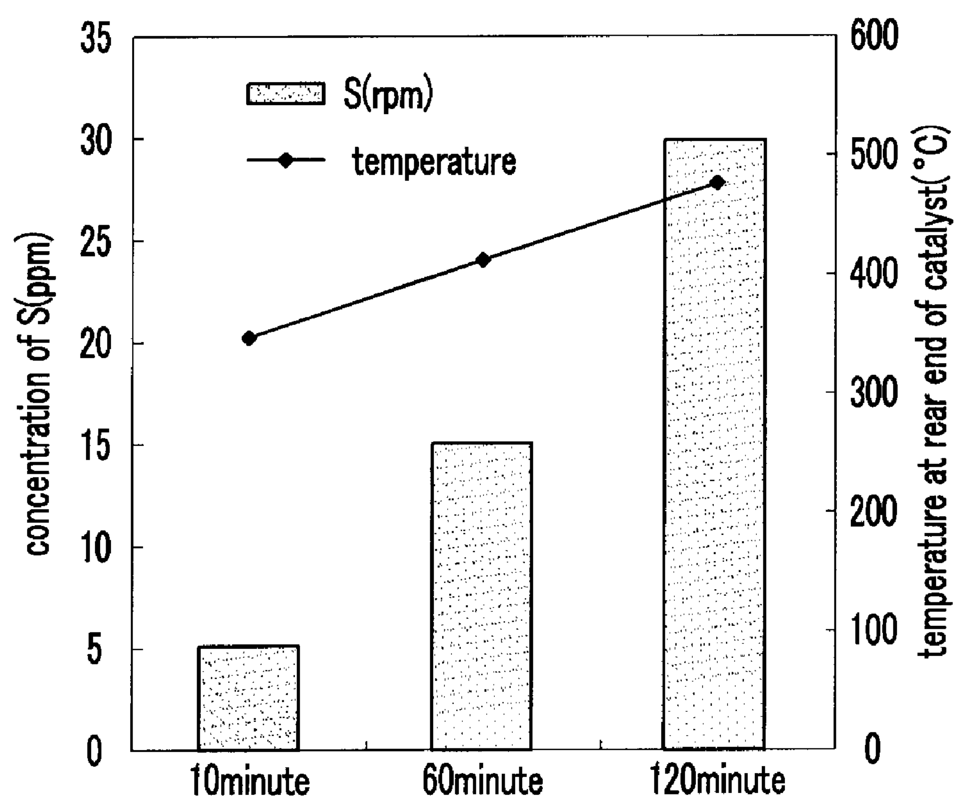
FIG. 4 is a graph showing concentration of sulphur and temperature at a rear end of a diesel oxidation catalyst when temperature of an exhaust gas is increased to a predetermined temperature after an engine provided with an exhaust system according to exemplary embodiments of the present invention is driven at an idle state during a predetermined time.

FIG. 4 is a graph showing concentration of sulphur and temperature at a rear end of a diesel oxidation catalyst when temperature of an exhaust gas is increased to a predetermined temperature after an engine provided with an exhaust system according to exemplary embodiments of the present invention is driven at an idle state during a predetermined time.

In a case that the engine 10 is driven by using fuel containing 50 ppm sulphur at an idle state during 10 minute, a little amount of the oxidation heat is generated even if the temperature of the exhaust gas is raised to the predetermined temperature (about 350° C.) since a little amount of the HC is absorbed at the first portion 44. Therefore, only 5 ppm sulphur may be released.

On the contrary, the engine 10 is driven by using fuel containing 50 ppm sulphur at the idle state during 120 minute, a large amount of the oxidation heat is generated since a large amount of the HC is absorbed at the first portion 44. Therefore, 32 ppm sulphur may be released.

Therefore, the HC absorbed at the first portion 44 is very effective for releasing the sulphur absorbed at the second portion 46.

Figure 5:
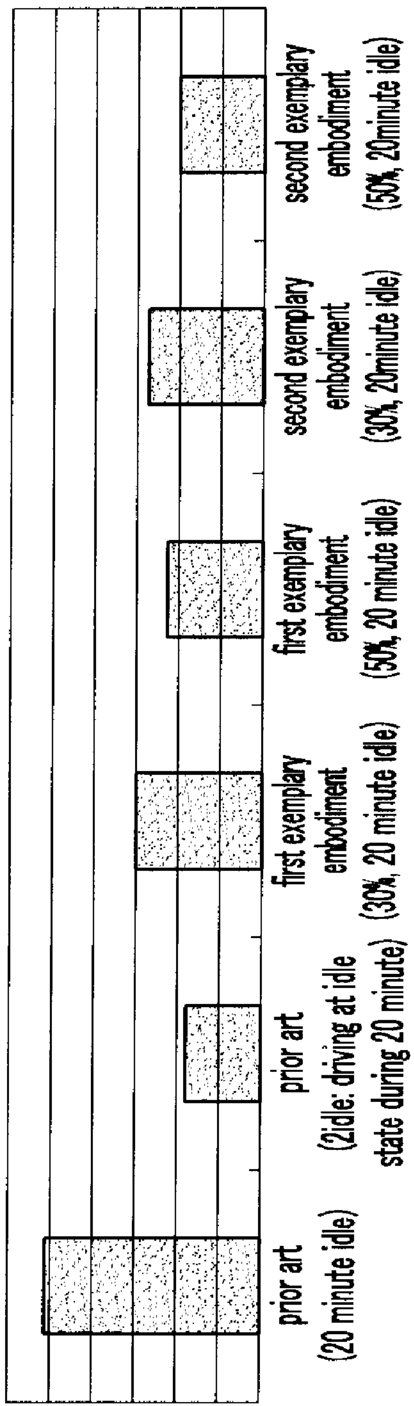
FIG. 5 is a graph showing concentration of HC and CO in a case that an engine provided with exhaust systems according to conventional arts and according to exemplary embodiments of the present invention, respectively.
Figure 6:
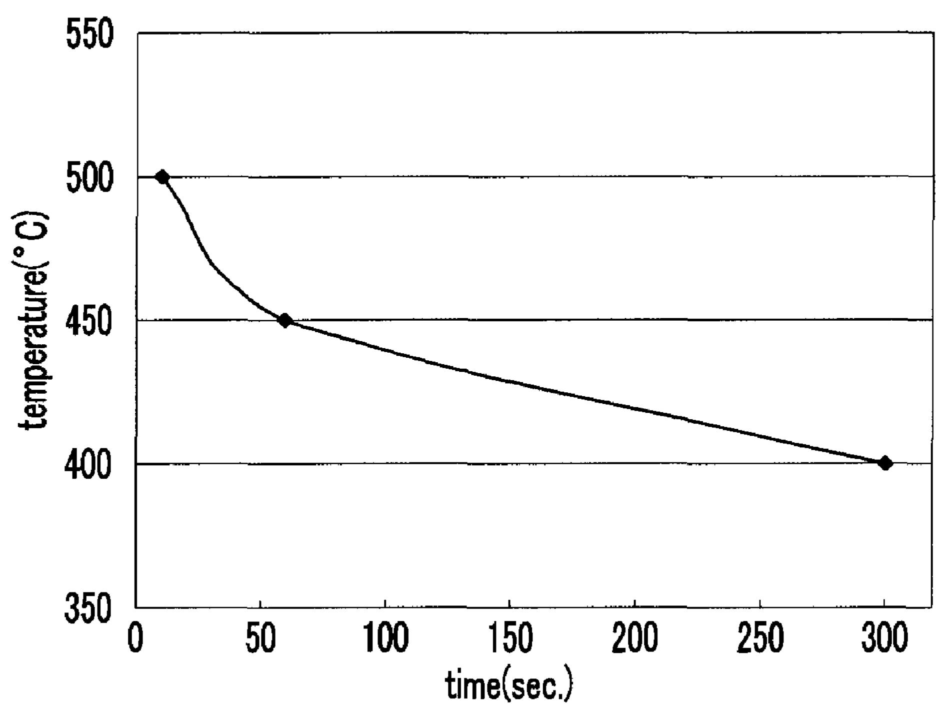
FIG. 6 is a graph showing relations between a temperature of an exhaust gas and a time required for recovering activity of an oxidation catalyst after poisoning of sulphur.

FIG. 5 is a graph showing concentration of HC and CO in a case that an engine provided with exhaust systems according to conventional arts and according to exemplary embodiments of the present invention, respectively. 30% and 50% in the drawings means that the HC trap is 30% and 50% of the washcoat in the first portion 44, respectively.

As shown in FIG. 5, oxidation capability of the HC and the CO is deteriorated when the exhaust system according to the prior arts is driven at the idle state during 20 minute. In this case, the diesel oxidation catalyst is regenerated at 500° C. in order to recover its oxidation capability.

However, the exhaust system according to exemplary embodiments of the present invention may have sufficient oxidation capability of the HC and the CO without regeneration of the diesel oxidation catalyst. Particularly, in a case that the HC trap is 50% of the washcoat in the first portion 44, the exhaust system according to exemplary embodiments of the present invention has similar oxidation capability of the HC and the CO to the exhaust system according to the prior arts where the oxidation catalyst is regenerated.

According to the present invention as described above, stable purifying performance of hydrocarbon may be attained as a consequence that the hydrocarbon contained in an exhaust gas is absorbed in a low temperature and activity of an oxidation catalyst is recovered in a high temperature by using oxidation heat of the absorbed hydrocarbon.

In addition, since the oxidation catalyst including platinum and palladium is used, manufacturing cost may be reduced.

For convenience in explanation and accurate definition in the appended claims, the terms "upper", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A diesel oxidation catalyst mounted on an exhaust pipe that exhausts an exhaust gas generated in an engine to the exterior, comprising:

a first portion having a hydrocarbon trap (HC trap) coated thereon, the HC trap absorbing or releasing a hydrocarbon (HC); and a second portion having an oxidation catalyst coated thereon, the oxidation catalyst oxidizing the hydrocarbon (HC) and a carbon monoxide (CO) in the exhaust gas;

wherein the second portion performs oxidation reaction with the HC released from the first portion and releases sulphur absorbed at the oxidation catalyst by using oxidation heat generated in the oxidation reaction thereof;

wherein the HC trap is a beta zeolite;

wherein the HC trap absorbs the HC when the temperature of the exhaust gas is lower than a predetermined temperature and releases the HC when the temperature of the exhaust gas is higher than a predetermined temperature;

wherein the beta zeolite has a structure of twelve rings and ratio of silica $SiO_2$ to aluminum oxide $Al_7O_3$ is 24-38; and wherein the HC trap is between approximately 30% and approximately 50% of entire washcoat in the first portion.

2. The diesel oxidation catalyst of claim 1, wherein the first portion is coated on a carrier and the second portion is coated on the first portion.

3. The diesel oxidation catalyst of claim 2, wherein the exhaust gas is configured to contact the second portion at first.

4. The diesel oxidation catalyst of claim 1, wherein the first portion is coated on a carrier and the second portion is coated on the carrier.

5. The diesel oxidation catalyst of claim 4, wherein the first portion and the second portion are aligned in sequence along a flowing direction of the exhaust gas such that the exhaust gas contacts the first portion at first.

6. The diesel oxidation catalyst of claim 1, wherein the first portion is coated on a carrier at a front portion of the diesel oxidation catalyst, and the second portion is coated on the carrier at a rear portion of the diesel oxidation catalyst.

7. The diesel oxidation catalyst of claim 1, wherein a noble metal including platinum (Pt) and palladium (Pd) is used for the oxidation catalyst.

8. An exhaust system mounted on an exhaust pipe through which an exhaust gas generated in an engine passes and purifying noxious materials contained in the exhaust gas, the exhaust system comprising a diesel oxidation catalyst oxidizing HC and CO, wherein the diesel oxidation catalyst is a diesel oxidation catalyst of claim 1.

* * * * *